United States Patent [19]

Pezzaglia

[11] 3,797,880

[45] Mar. 19, 1974

[54] EXTENDABLE VEHICLE BODY
[75] Inventor: Paolo Pezzaglia, Milan, Italy
[73] Assignee: Carrozzeria Boneschi Srl, Milan, Italy
[22] Filed: June 1, 1972
[21] Appl. No.: 263,365

[52] U.S. Cl..................................... 206/26, 52/67
[51] Int. Cl............................................ B62d 33/08
[58] Field of Search........ 296/26, 23 C, 23 R; 52/67

[56] References Cited
UNITED STATES PATENTS
2,842,972  7/1958  Houdart............................ 296/23 C

*Primary Examiner*—Philip Goodman
*Attorney, Agent, or Firm*—Dr. G. Modiano; Dr. A. Josif

[57] ABSTRACT

A guide for the movement of the walls of vehicle bodies of the extendable wall type comprising at least a first and a second beam member constituted of sections, and supporting the first member a plurality of wheels mounted on ball bearings, adapted to engage with rolling tracks defined inside the second member, so as to permit the sliding engagement of the first member in the second member, the first member being connected to the extendable walls whereas the second member is fixed to a vehicle chassis.

2 Claims, 6 Drawing Figures

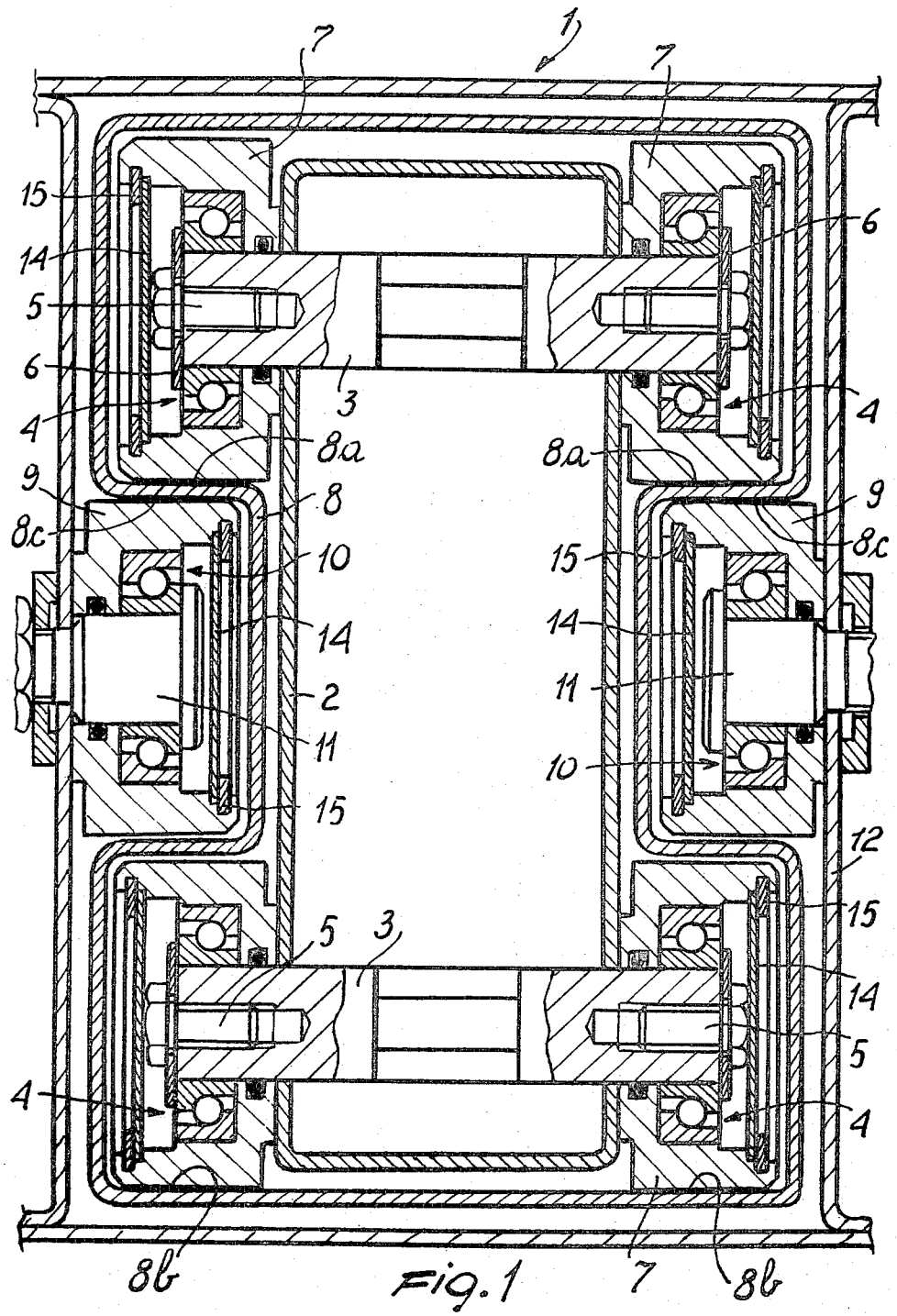

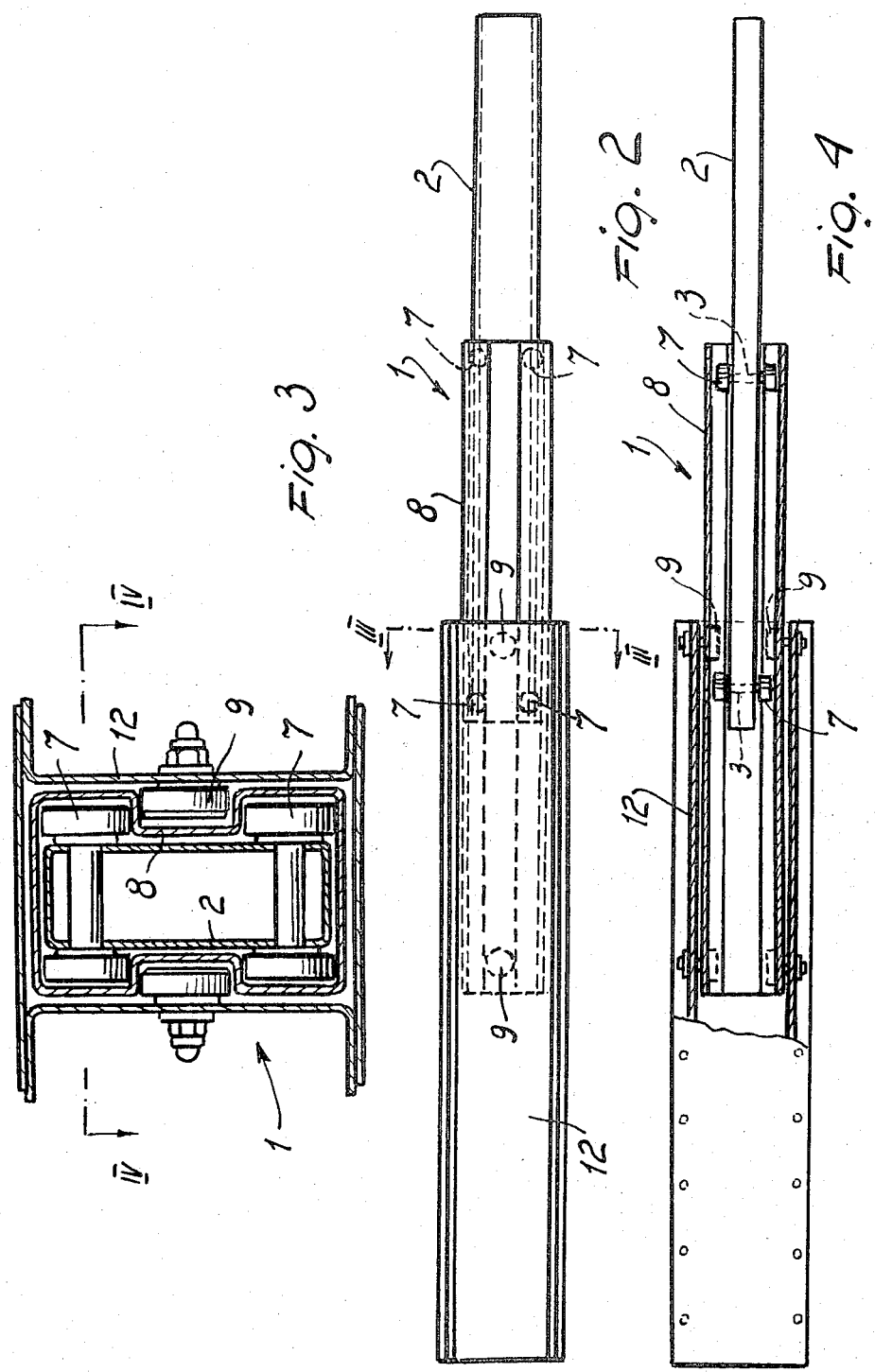

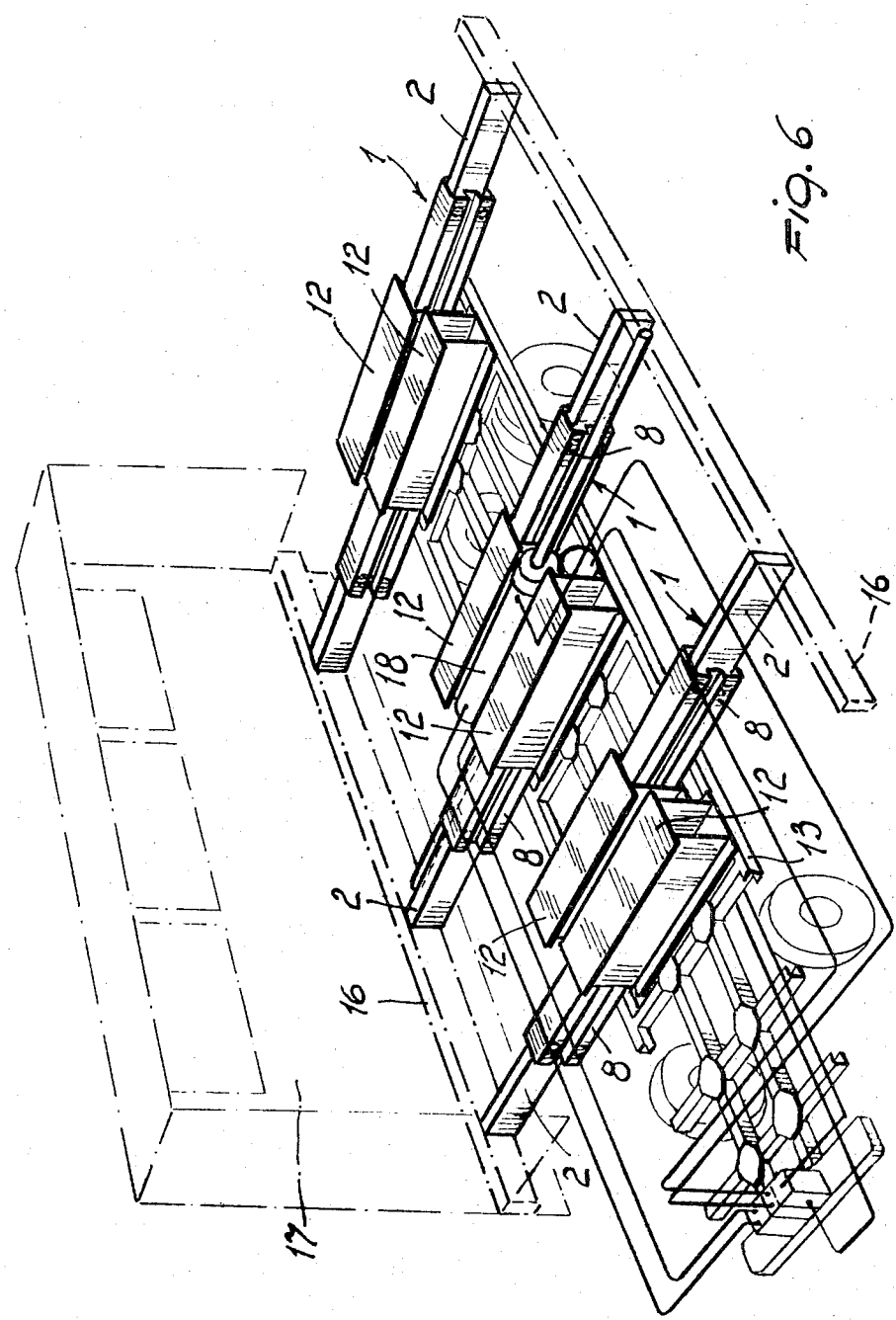

EXTENDABLE VEHICLE BODY

BACKGROUND OF THE INVENTION

The present invention relates to a guide for the movement of the walls of vehicle bodies of the extendable wall type.

Vehicles with extendable wall bodies are widely known, and are particularly used as mobile health units, mobile publicity units, mobile exhibitions and the like.

These vehicles enable their useful covered area to be considerably increased, for example by movement of the side walls, thrust by hydraulic units and guided in their motion by bogies directly connected to said hydraulic units, and by auxiliary guides of the prismatic type, which assist the bogies both in their guide function and in supporting those parts of the body which project overhanging from the sides.

The various devices used on said vehicles for moving the walls perform their duty with reasonable efficiency, but there are certain aspects of the guides which can be improved.

Said guides, being of the prismatic guide type, offer a certain friction resistance to movement, which means that a certain part of the power of the hydraulic units must be used for overcoming passive resistances. Moreover, after a certain period of use, a certain undesirable play arises in said guides which obviously prejudices their operation, allowing rocking which prejudices the stability of the projecting overhanging parts.

A further disadvantage of traditional guides is that they allow the walls to emerge from the perimeter of the vehicle chassis only to one fixed extent of overhang, i.e., they do not allow said walls to be extended to a greater or lesser extent according to requirements.

SUMMARY OF THE INVENTION

The main object of the present invention is to eliminate all the aforementioned disadvantages and to improve those aspects susceptible to improvement, by providing a guide for the movement of the walls of vehicle bodies of the extendable wall type which offers minimum friction resistance during movement, and at the same time is capable of providing and maintaining high operational precision, by preventing the creation of play between those parts which move relative to each other.

A further object of the invention is to enable the extent of extension of the walls of a motor vehicle to be varied.

These and further objects which will be more evident hereinafter are attained by a guide for the movement of the walls of vehicle bodies of the extendable wall type comprising at least a first and a second beam member constituted of sections, and supporting said first member a plurality of wheels mounted on ball bearings, adapted to engage with rolling tracks defined inside said second member, so as to permit the sliding engagement of said first member in said second member, said first member being connected to said extendable walls whereas said second member is fixed to a vehicle chassis.

BRIEF DESCRIPTION OF THE DRAWINGS

Further characteristics and advantages of the invention will be more evident from the detailed description of a preferred but not exclusive embodiment of a guide according to the invention, illustrated by way of example in the accompanying drawings in which:

FIG. 1 is a normal section through the guide according to the invention;

FIG. 2 is a side view of the guide of FIG. 1 in the semi-extended position;

FIG. 3 is a section on the line III—III of FIG. 2;

FIG. 4 is a plan view, partially in section, on the line IV—IV of FIG. 3;

FIG. 6 is a perspective representation of the chassis of FIG. 5.

DESCRIPTION OF THE PREFERRED EMBODIMENTS

Figure 5:
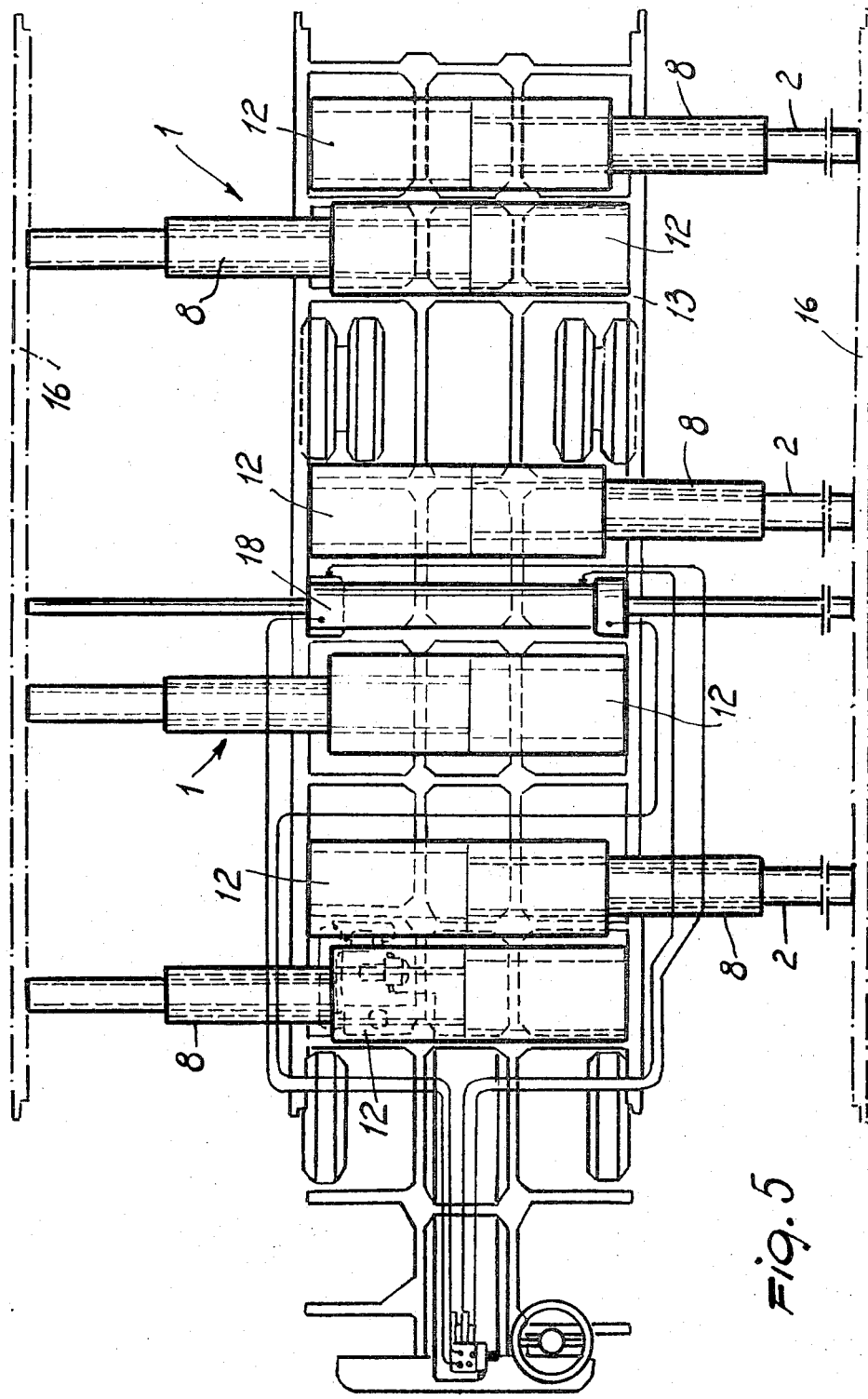
FIG. 5 is a plan view of the chassis of a vehicle of the extendable wall type, to which six guides according to the invention are fixed.

With reference to the aforementioned figures, the guide according to the invention is indicated overall by the reference numeral 1.

The guide 1 comprises a first section 2 of closed rectangular cross-section. In the section 2 are fixed four pivots 3 which traverse its entire width and project for a certain distance at their extremities where they support ball bearings 4, fixed by bolts 5 to said pivots 3 with washers 6 between. Wheels 7 are fixed externally on the bearings 4 and engage in upper horizontal rolling tracks 8a and lower horizontal rolling tracks 8b, defined by the internal faces of a second section 8 of ᴖ shaped closed cross-section. The section 8 externally defines horizontal rolling tracks 8c for four wheels or guiding rollers 9, mounted on ball bearings 10, keyed on to pivots 11 which are fixed to a third section 12 of composite cross-section, situated external to the section 8 and fixed to the chassis 13 of a motor vehicle (see FIGS. 5 and 6). Both the bearings 4 and the bearings 10 are protected from atmospheric agents by plates 14 held by suitable Seeger rings 15 connected to the wheels 7 and 9.

According to one of the possible embodiments outlined in the summary of the invention the third section or elongated casing 12 could be omitted and the second section fixed on the chassis 13. The second section 8 would then function as an elongated casing of shaped profile with the first section 2 telescopically arranged therein.

Six guides 1 are present in the embodiment shown in FIGS. 5 and 6, and are connected in threes to support beams 16 for the side walls 17 of the body of a motor vehicle. Movement of the walls 17 is obtained by two hydraulic cylinder-piston units 18, placed one above the other with their axes parallel and with opposite directions of motion.

The hydraulic system which serves the units 18 will not be further described, being of known type.

The operation of the device according to the invention is evident.

Said guide acts as a guide and support when the units 18 move the sidewalls 17 of the vehicle. In the particular case shown the mobile section 2 of each guide 1 moves with respect to the section 8 by means of the wheels 7, which roll on the tracks 8a and 8b defined by said section 8, whereas the section 8 moves with respect to the section 12, fixed to the chassis 13, by means of the wheels 9 which enable the section 8, engaged on said wheels by means of the tracks 8c, to move easily.

From the aforegoing description it is evident that the guide according to the invention attains all its objects. All relative movements of the various sections are obtained by means of wheels provided with ball bearings, so ensuring minimum expenditure of energy for overcoming friction resistance and maximum operational precision. Moreover the use of two sections which slide axially one in the other, and which slide together with respect to a third fixed section, enables a large extension to be obtained for the part which projects overhanging with respect to the chassis 13.

It should be noted that although a guide has been described composed of three sections, two of which are mobile, it is not limitative in that the device according to the invention may be constructed with any number of sections from two onwards, one of which is fixed. Furthermore the number and disposition of the guides may be modified according to the extension and capacity requirements of the individual vehicles.

The invention so conceived is susceptible to numerous further modifications, all of which fall within the scope of the inventive idea.

I claim:

1. A guide for the movement of the walls of vehicle bodies of the extendable wall type comprising fixed on the chassis of the vehicle, an elongated casing and arranged telescopically therein at least one beam member constituted of sections, said beam member having a plurality of wheels mounted on ball bearings, said elongated casing having a cross-section of shaped profile substantially in the form of a double T, whose shaping defines internal longitudinal rolling tracks for said wheels.

2. A guide for the movement of the walls of vehicle bodies of the extendable wall type, comprising, fixed on the chassis of the vehicle, an external beam member in the form of an elongated casing, and arranged telescopically therein an intermediate beam member having a hollow cross-section of shaped profile, substantially in the form of a double T, and an internal beam member, said internal beam member having a plurality of wheels mounted on ball bearings, and said external beam member having guiding rollers for said intermediate beam member, said double T shaped profile of said intermediate beam member defining externally longitudinal rolling tracks in guiding engagement with said guiding roller of said external beam member, and said double T shaped profile of said intermediate beam member defining internally further longitudinal rolling tracks for said plurality of wheels of said internal beam member.

* * * * *

UNITED STATES PATENT OFFICE
CERTIFICATE OF CORRECTION

Patent No. __3,797,880__   Dated __March 19, 1974__

Inventor(s) __Paolo PEZZAGLIA__

It is certified that error appears in the above-identified patent and that said Letters Patent are hereby corrected as shown below:

In the title page, after the line identifying the application number, insert the following:

/30/ Foreign Application Priority Data

March 29, 1972 Italy............22562 A/72

Signed and sealed this 17th day of June 1975.

(SEAL)
Attest:

RUTH C. MASON
Attesting Officer

C. MARSHALL DANN
Commissioner of Patents
and Trademarks